(12) United States Patent
Ganzera et al.

(10) Patent No.: US 7,359,695 B2
(45) Date of Patent: Apr. 15, 2008

(54) CIRCUIT FOR A DATA CARRIER, WHICH CIRCUIT CAN BE SWITCHED FROM AN ENERGY-SAVING PROCESSING MODE TO A NORMAL-CONSUMPTION PROCESSING MODE

(75) Inventors: Michael Ganzera, Graz (AT); Gerhard Schalk, Stattegg (AT)

(73) Assignee: NXP B.V., Eindhoven (NL)

( * ) Notice: Subject to any disclaimer, the term of this patent is extended or adjusted under 35 U.S.C. 154(b) by 112 days.

(21) Appl. No.: 10/564,239

(22) PCT Filed: Jul. 14, 2004

(86) PCT No.: PCT/IB2004/051216

§ 371 (c)(1),
(2), (4) Date: Jan. 10, 2006

(87) PCT Pub. No.: WO2005/009063

PCT Pub. Date: Jan. 27, 2005

(65) Prior Publication Data

US 2006/0194622 A1      Aug. 31, 2006

(30) Foreign Application Priority Data

Jul. 18, 2003  (EP) .................................. 03102222

(51) Int. Cl.
*H04B 1/16* (2006.01)

(52) U.S. Cl. .................... 455/343.2; 455/558; 455/574; 340/10.34

(58) Field of Classification Search ............. 455/343.1, 455/73, 90.2, 90.3, 572, 574, 127.1, 41.1, 455/41.2, 41.3, 343.2, 343.3, 343.4, 558; 340/10.2, 10.3, 10.34

See application file for complete search history.

(56) References Cited

U.S. PATENT DOCUMENTS 6,198,382 B1 * 3/2001 Berger et al. ............. 340/10.34

(Continued)

FOREIGN PATENT DOCUMENTS

EP    0 709 803    5/1996

(Continued)

*Primary Examiner*—Quochien B. Vuong
(74) *Attorney, Agent, or Firm*—Peter Zawilski

(57) ABSTRACT

Provided in a circuit (8) for a data carrier (7) are a circuit part (12), which requires a relatively large amount of energy, and at least part of a contact interface (11) via which the circuit part (12) can be supplied with electrical energy, which circuit part (12) is designed to process data signals (DS1, DS2) in a normal-consumption processing mode and in an energy-saving processing mode in which less energy is required than in the normalconsumption processing mode, and which circuit part (12) can be switched into the energysaving processing mode when energy is being supplied via the contact interface (11) and which circuit part (12) can be switched, with the aid of a first mode change signal (MC 1) that can be fed thereto, from the energy-saving processing mode into the normal-consumption processing mode, and further provided in this circuit (8) is at least part of a contactless interface (23) via which a carrier signal (TS) can be received by the circuit (8), and furthermore provided in this circuit (8) is a mode change signal generation stage (24) which is designed to detect receipt of the carrier signal (TS) via the contactless interface (23) and, upon detection of the receipt of the carrier signal (TS), to generate and output the first mode change signal (MC1) to the circuit part (12).

11 Claims, 1 Drawing Sheet

U.S. PATENT DOCUMENTS

Figure 1:
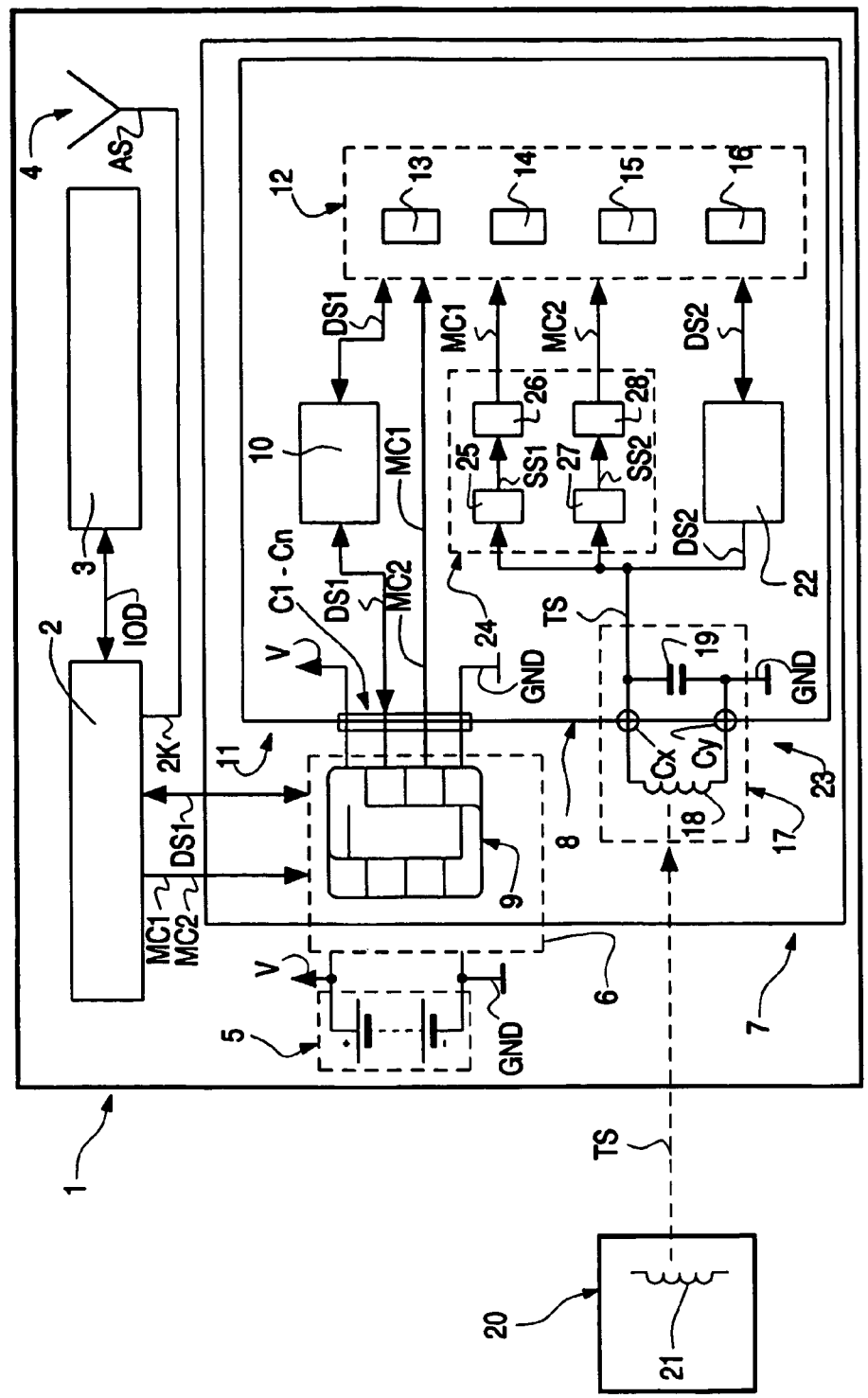

| | | | |
|---|---|---|---|
| 6,364,207 B1 * | 4/2002 | Thuringer et al. | 235/492 |
| 6,597,893 B2 * | 7/2003 | Zettler | 455/41.1 |
| 6,671,493 B2 * | 12/2003 | Cernusca et al. | 455/41.2 |
| 6,827,278 B1 * | 12/2004 | Timm et al. | 235/492 |
| 6,831,548 B1 * | 12/2004 | Eber et al. | 340/10.33 |
| 2003/0066895 A1 * | 4/2003 | Hikita et al. | 235/492 |

FOREIGN PATENT DOCUMENTS

| | | |
|---|---|---|
| EP | 0 886 232 | 12/1998 |
| WO | WO 02/51183 | 6/2002 |

* cited by examiner

CIRCUIT FOR A DATA CARRIER, WHICH CIRCUIT CAN BE SWITCHED FROM AN ENERGY-SAVING PROCESSING MODE TO A NORMAL-CONSUMPTION PROCESSING MODE

The invention relates to a circuit for a data carrier, which circuit has terminals for connection to at least part of a contact interface, via which contact interface a circuit part of the circuit can be supplied with electrical energy, and which circuit has the circuit part, which circuit part is designed to process data signals in a normal-consumption processing mode and in an energy-saving processing mode in which less energy is required than in the normal-consumption processing mode, and which circuit part can be switched into the energy-saving processing mode when energy is being supplied via the contact interface and which circuit part can be switched, with the aid of a first mode change signal that can be fed thereto, from the energy-saving processing mode into the normal-consumption processing mode, and which circuit has terminals for connection to at least part of a contactless interface.

The invention furthermore relates to a data carrier comprising such a circuit.

The invention furthermore relates to a method of changing a processing mode of a circuit for a data carrier, which circuit has terminals for connection to at least part of a contact interface and terminals for connection to at least part of a contactless interface, via which contact interface a circuit part of the circuit can be supplied with electrical energy, which circuit part is used, when energy is being supplied via the contact interface, to process data signals in a normal-consumption processing mode and in an energy-saving processing mode in which less energy is required than in the normal-consumption processing mode, and which circuit part can be switched into an energy-saving processing mode when energy is being supplied via the contact interface and which circuit part can be switched, with the aid of a first mode change signal that can be fed thereto, from the energy-saving processing mode into the normal-consumption processing mode.

Such a circuit of the type mentioned in the first paragraph and such a data carrier of the type mentioned in the second paragraph and such a method of the type mentioned in the third paragraph are known from the patent WO 02/51183 A1.

The known data carrier comprising the known circuit, by means of which circuit the known method can be carried out, is a so-called "subscriber identification module" or SIM for a mobile telephone. The SIM is placed in a mobile telephone and electrically contacted with the mobile telephone via a contact interface of the SIM. As soon as the mobile telephone is switched on, the SIM is likewise supplied with energy via the contact interface, wherein a supply voltage is fed to the SIM via two contacts of the contact interface, said supply voltage being generated by a battery contained in the mobile telephone. A microcontroller which is contained in the SIM and forms a circuit part is then activated by a reset circuit, whereupon the microcontroller starts an operating system and runs a program, and is then in an activated or started state for processing data signals. The SIM furthermore has a contactless interface which, using a carrier signal, allows contactless communication with a so-called reader station which generates the carrier signal. In the started state of the SIM or microcontroller, at least two processing modes which differ in terms of their energy requirement are possible, namely a normal-consumption processing mode and at least one energy-saving processing mode in which less energy is required than in the normal-consumption processing mode. The two processing modes are not disclosed in the document mentioned above, but are known to the person skilled in the art in this field since the latter is always striving to positively influence the time-limited availability of a battery-operated mobile phone, which depends on the performance of a battery and on an energy consumption of the electrical circuit, by virtue of a so-called sleep mode, that is to say by the energy-saving processing mode. In the sleep mode, the SIM requires less energy than in a normal-consumption processing mode, since in the sleep mode the microcontroller is not supplied with a clock signal. At the same time, however, the energy supply via the contact interface still exists, and the microcontroller or the program processed by the microcontroller or the program data that arose during running of the program are immediately available following wake-up from the sleep mode, that is to say following a change from the energy-saving processing mode to the normal-consumption processing mode, without it being necessary to restart an operating system and possibly to perform user identification once again.

In the case of the known data carrier, there is the problem that wake-up from the energy-saving processing mode into the normal-consumption processing mode can only be carried out as a result of communication via the contact interface, so that when the contactless interface is being used—for example as part of an electronic travel ticket system—the microcontroller always has to be woken up from its sleep mode by manual interaction by a user by means of the mobile telephone, for example by pressing a key, before it is possible for contactless communication to take place with a reader station in which, for example, electronic travel tickets are debited from the SIM or credited to the SIM.

It is an object of the invention to avoid the abovementioned problem in a circuit of the type mentioned in the first paragraph and in a data carrier of the type mentioned in the second paragraph and in a method of the type mentioned in the third paragraph, and to provide an improved circuit for an improved data carrier and an improved data carrier and an improved method.

In order to achieve the abovementioned object, features according to the invention are provided in a circuit according to the invention so that a circuit according to the invention can be characterized as follows, namely:

A circuit for a data carrier, which circuit has terminals for connection to at least part of a contact interface, via which contact interface a circuit part of the circuit can be supplied with electrical energy, and which circuit has the circuit part, which circuit part is designed to process data signals in a normal-consumption processing mode and in an energy-saving processing mode in which less energy is required than in the normal-consumption processing mode, and which circuit part can be switched into the energy-saving processing mode when energy is being supplied via the contact interface and which circuit part can be switched, with the aid of a first mode change signal that can be fed thereto, from the energy-saving processing mode into the normal-consumption processing mode, and which circuit has terminals for connection to at least part of a contactless interface, via which contactless interface a carrier signal can be received by the circuit, and which circuit has mode change signal generation means which are connected to the contactless interface and the circuit part and are designed to detect receipt of the carrier signal via the contactless interface and, upon detection of the receipt of the carrier signal, to generate the first mode change signal and output the generated first mode change signal to the circuit part.

In order to achieve the abovementioned object, a data carrier according to the invention is provided with a circuit according to the invention.

In order to achieve the abovementioned object, features according to the invention are provided in a method according to the invention so that a method according to the invention can be characterized as follows, namely:

A method of changing a processing mode of a circuit for a data carrier, which circuit has terminals for connection to at least part of a contact interface and terminals for connection to at least part of a contactless interface, via which contact interface a circuit part of the circuit can be supplied with electrical energy, which circuit part is used, when energy is being supplied via the contact interface, to process data signals in a normal-consumption processing mode and in an energy-saving processing mode in which less energy is required than in the normal-consumption processing mode, and which circuit part can be switched into an energy-saving processing mode when energy is being supplied via the contact interface and which circuit part can be switched, with the aid of a first mode change signal that can be fed thereto, from the energy-saving processing mode into the normal-consumption processing mode, which method comprises the following method steps, namely:

receipt of a carrier signal via the contactless interface and detection of the receipt of the carrier signal and generation of the first mode change signal upon detection of the receipt of the carrier signal and outputting of the generated first mode change signal to the circuit part.

By providing the measures according to the invention, the advantage is obtained whereby the circuit part can be switched from the energy-saving processing mode to the normal-consumption processing mode without any communication via the contact interface, wherein the circuit need only be brought into an existence range of the carrier signal around a reader station, in which existence range the carrier signal generated by the reader station exists with a signal parameter that can be evaluated by the mode change signal generation means.

In a solution according to the invention, it may be provided for example that the detection of the carrier signal takes place by means of a voltage that can be generated from the received carrier signal or by means of a current that can be generated from the received carrier signal. However, it has proven to be particularly advantageous if the measures as claimed in claim 2 and claim 8 are additionally provided. As a result, the advantage is obtained whereby the detection of the carrier signal takes place with a relatively high degree of certainty, even if the signal level of the carrier signal for the purposes of information transmission is still relatively low.

In a solution according to the invention, it may for example be provided that the first mode change signal is represented by an analog signal or a signal sequence. However, in the solution according to the invention it has proven to be particularly advantageous if the measures as claimed in claim 3 and claim 9 are additionally provided. As a result, the advantage is obtained whereby the first mode change signal can be processed in the circuit part just as if it had been received in the course of communication via the contact interface. As a result, the advantage is furthermore obtained whereby the processing of the first mode change signal in the circuit part is assigned a priority that corresponds to its importance, said priority being independent of other software-controlled data signal processing operations in the context of the hardware-based interrupt hierarchy.

In the solution according to the invention, it has furthermore proven to be advantageous if the measures as claimed in claim 4 and claim 10 are provided. As a result, the advantage is obtained whereby it is ensured that, as soon as the circuit is taken out of the existence range of the carrier signal, the circuit part is again placed in its energy-saving processing mode, that is to say in its energy-saving sleep mode.

In a solution according to the invention, it has furthermore proven to be advantageous if the measures as claimed in claim 5 and claim 11 are provided. As a result, the advantage is obtained whereby, in the event of a short-term non-availability of the carrier signal, that is to say if the circuit is used for example in an edge region of the existence range of the carrier signal or if for example the carrier signal is shadowed for a short period, a communication via the contactless interface that has already been started is not terminated immediately by changing into the energy-saving processing mode but rather is terminated only once it has been ensured, by waiting for the waiting time to expire, that it is not an inadvertent termination of the communication on account of an unintentional interruption of the carrier signal but rather it is actually no longer necessary to continue in the normal-consumption processing mode since the circuit has intentionally been taken out of the existence range of the carrier signal and the energy-saving processing mode can be activated in order to ensure as long a service life as possible for a battery-operated device.

In a data carrier according to the invention, the advantages mentioned above in connection with the circuit according to the invention are likewise obtained.

The abovementioned aspects and further aspects of the invention emerge from the example of embodiment described below and are explained with reference to said example of embodiment.

The invention will be further described with reference to an example of embodiment shown in the drawing to which, however, the invention is not restricted.

FIG. 1 schematically shows a data carrier comprising a circuit according to one example of embodiment of the invention.

FIG. 1 shows a portable combination device, namely a mobile telephone 1, which has a switching stage 2, an input/output stage 3, a telephone antenna 4, a battery module 5 and a mobile telephone contact field 6, which mobile telephone contact field 6 is designed for contacting a "subscriber identification module" or SIM that can be placed in the mobile telephone 1 and removed from the mobile telephone. The mobile telephone contact field 6 meets the specification according to standard ISO 7816. The battery module 5 is formed by a rechargeable accumulator which is provided to output a supply voltage V, needed to operate the mobile telephone 1, with respect to a reference potential GND for all electronic functions of the mobile telephone 1. The battery module 5 is furthermore in contact with the mobile telephone contact field 6, so that the supply voltage V can be fed to the SIM via the mobile telephone contact field 6. The telephone antenna 4 is connected to the switching stage 2. The switching stage 2 is designed to process an antenna signal AS which occurs at an input 2K in the event of telephone communication via the telephone antenna 4. The switching stage 2 is furthermore designed to exchange and process input/output data 10D with an input/output stage 3, the input/output data 10D occurring during use of the mobile telephone 1. The switching stage 2 is furthermore connected to the mobile telephone contact field 6 so that first data signals DS1 that occur in the event of contact communication with the SIM in the mobile telephone 1 can be exchanged with the SIM via the mobile telephone contact field 6 and where appropriate processed by the switching stage 2. The switching stage 2 is moreover designed to generate a first mode change signal MC1 and a second mode change signal MC2 and to output these mode change signals MC1 and MC2 to the SIM via the mobile telephone contact field 6, as will be described in more detail below.

The SIM placed in the mobile telephone 1 is formed by a data carrier 7 which has an electrical circuit 8. The data carrier 7 furthermore has a data carrier contact field 9 which is connected to the circuit 8 via a number of terminals C1-Cn that are shown in a highly schematic manner in FIG. 1, said data carrier contact field 9, like the mobile telephone contact field 6, meeting the specification of standard ISO 7816 and accordingly having contacts that correspond to those of the mobile telephone contact field 6. The circuit 8 of the data carrier 7 furthermore has a first communication means 10 which is designed to communicate the first data signal DS1 in accordance with the standard ISO 7816 via the data carrier contact field 9. The first communication means 10 and the data carrier contact field 9 form a contact interface 11 of the data carrier 7. Accordingly, the circuit 8 forms at least part of the contact interface 11, the latter being used to supply a circuit part 12 of the circuit 8 with electrical energy.

The circuit part 12 is formed by a microcontroller which forms data processing means. Such a microcontroller during operation requires a relatively large amount of energy compared to other parts of the circuit 8. Therefore, attempts are always being made to keep the energy consumption of such a microcontroller relatively low. The circuit part 12 has an interrupt signal processing stage 13, a memory stage 14, a coprocessor stage 15 and a "central processing unit" or CPU stage 16. By means of these stages 13 to 16, the circuit part 12 is designed to exchange the first data signals DS1 with the first communication means 10. The circuit part 12 is furthermore designed to process the first data signals DS1 in a normal-consumption processing mode and in an energy-saving processing mode in which there is a smaller energy consumption or in which less energy is required than in the normal-consumption processing mode. The circuit part 12 can furthermore be switched by the interrupt signal processing stage 13 when energy is being supplied via the data carrier contact field 9 or the mobile telephone contact field 6 with the aid of the first mode change signal MC1 from the energy-saving processing mode to the normal-consumption processing mode or with the aid of the second mode change signal MC2 from the normal-consumption processing mode to the energy-saving processing mode. The first mode change signal MC1 and the second mode change signal MC2 form so-called interrupt signals which can be fed to the data carrier 7 or the circuit 8 thereof by the switching stage 2 via the contact interface 11—that is to say in the case of contact communication—and can be processed by the interrupt signal processing stage 13 as a function of their importance. In the present case, a clock signal (not shown in FIG. 1) for the circuit part 12, which clock signal is needed to process the first data signals DS1, can be activated by the interrupt signal processing stage 13 when the first mode change signal MC1 is present. Furthermore, when the second mode change signal MC2 is present the clock signal for the circuit part 12 can be deactivated, as a result of which the energy consumption of the circuit 8 can be considerably reduced compared to the normal-consumption processing mode and consequently the service life or length of time for which the battery module 5 can provide sufficient energy to operate the mobile telephone 1 is accordingly extended, since the battery module 5 has to provide correspondingly less energy for the circuit 8 in the energy-saving processing mode. The mode change signals MC1 and MC2 which can be fed to the data carrier 7 via the data carrier contact field 9 can be generated by the switching stage 12 predominantly as a result of the fact that a user is operating the mobile telephone 1 via the input/output stage 3.

The data carrier 7 is furthermore provided with a resonant circuit 17 which has a data carrier communication coil 18 arranged outside the circuit 8, which data carrier communication coil is connected to the circuit 8 via two further terminals Cx and Cy of the circuit 8. The resonant circuit 17 furthermore has a capacitor 19 within the circuit 8, which capacitor is connected in parallel with the data carrier communication coil 18. The resonant circuit 17 is designed to transmit a carrier signal TS from outside the data carrier 7 into the circuit 8. The carrier signal TS can be generated by a stationary communication device, namely a so-called reader station 20, which is arranged outside the mobile telephone 1 and is shown in a highly schematic manner in FIG. 1, said reader station being designed to generate the carrier signal TS in accordance with the specification of the standard ISO 14443. Of the means for generating the carrier signal TS, only a reader communication coil 21 is shown inside the reader station 20, said reader communication coil being provided and designed to produce an inductive coupling to the data carrier communication coil 18. When this inductive coupling between the two coils 21 and 18 exists, second data signals DS2 can be exchanged between the data carrier 7 and the reader station 20 by means of the carrier signal TS during contactless communication. For this purpose, the circuit 8 has second communication means 22 which are designed to communicate the second data signals DS2 in accordance with the standard ISO 14443. The resonant circuit 17 and the second communication means 22 form a contactless interface 23 of the data carrier 7. Accordingly, the circuit 8 forms at least part of the contactless interface 23 according to the standard ISO 14443, by means of which the carrier signal TS can be received.

The circuit part 12 is designed to exchange the second data signals DS2, which occur during contactless communication, with the second communication means 22. The circuit part 12 is furthermore designed to process the second data signals DS2 in the normal-consumption processing mode and in the energy-saving processing mode.

The circuit 8 furthermore has mode change signal generation means 24 which are connected to the contactless interface 23 and the circuit part 12 and are designed to detect receipt of the carrier signal TS via the contactless interface 23 and upon detection of the receipt of the carrier signal TS to generate the first mode change signal MC1 and to output the generated first mode change signal MC1 to the circuit part 12. For this purpose, the mode change signal generation means 24 have a carrier signal frequency detection stage 25 which can be fed the received carriers signal TS and which, taking account of the frequency of the received carrier signal TS, are designed to detect receipt of the carrier signal TS and to generate and output a first indicator signal SS1 which indicates that receipt of the carrier signal TS has been detected. The mode change signal generation means 24 furthermore have an interrupt signal generation stage 26 which is designed to receive the first indicator signal SS1 and is designed, once it has been indicated that receipt of the carrier signal TS has been detected, to generate an interrupt signal which represents the first mode change signal MC1, which interrupt signal can be fed to the interrupt signal processing stage 13 of the circuit part 12.

The mode change signal generation means 24 are furthermore designed to detect a receive status change from receiving the carrier signal TS to not receiving the carrier signal TS, and to output the second mode change signal MC2 to the interrupt signal processing stage 13 of the circuit part 12 if or as soon as the receive status change is detected. For this purpose, the mode change signal generation means 24 have a receive status change detection stage 27 which is connected to the resonant circuit 17 of the contactless interface 23 and is designed to detect the receive status change and, upon detection of the receive status change, to output a second indicator signal SS2, which second indicator signal SS2 indicates that the receive status change has been detected. The mode change signal generation means 24 furthermore have a second interrupt signal generation stage 28 which is designed to receive the second indicator signal SS2 and to generate and output to the interrupt signal processing stage 13 an interrupt signal which represents the second mode change signal MC2.

The mode change signal generation means 24, specifically the second interrupt signal generation stage 28, is furthermore designed to output the second mode change signal MC2 in a manner delayed by a waiting time if, following detection of the receive status change, no new receipt of the carrier signal TS can be detected during the waiting time, that is to say no new receive status change from not receiving the carrier signal TS to receiving the carrier signal TS. For this purpose, the second interrupt signal generation stage 28 has a counter stage (not shown in FIG. 1) which in the event of a receive status change from receiving to not receiving the carrier signal TS is charged with a counter value that represents the waiting time and, following detection of the receive status change from receiving to not receiving the carrier signal TS, the counter value is reduced periodically in accordance with a counter clock signal (not shown in FIG. 1) until, following expiry of the waiting time, that is to say as soon as the counter value represents the value zero, the second mode change signal MC2 is output.

The advantage is thus obtained that, while avoiding communication via the contact interface 11 alone—that is to say without the user doing anything—the first mode change signal MC1 can be generated by detecting receipt of the carrier signal TS via the contactless interface 23, and, upon detection of a receive status change, which occurs thereafter, from receiving the carrier signal TS to not receiving the carrier signal TS, the second mode change signal MC2 can be generated. Operation of the mobile telephone 1 in a manner that saves as much energy as possible is thereby achieved.

Hereinbelow, the function of the data carrier 7 and of the circuit 8 contained in the data carrier 7 will be explained with reference to a use example of the data carrier 7 as shown in FIG. 1. In this use example, it is assumed that the circuit part 12, that is to say the microcontroller, is switched into the energy-saving processing mode by means of the second mode change signal MC2 which is received via the contact interface 11. It is furthermore assumed that a user of the mobile telephone 1 would like to use a means of public transport and together with the mobile telephone 1 passes a control gate in an access area of the means of public transport. The control gate is equipped with the reader station 20 shown in FIG. 1, which reader station 20 permanently generates the carrier signal TS so that the carrier signal TS exists in a control gate area. By means of the carrier signal TS, the reader station 20 transmits an inquiry command represented by the second data signals DS2. Following receipt of the inquiry command, the data carrier 7 must relatively quickly communicate a response to the reader station 20 by means of the second data signals DS2, since the data carrier 7 is moved through the control gate relatively quickly by the user.

As soon as the user together with the mobile telephone 1 walks up to the control gate, that is to say enters the existence range of the carrier signal TS, an inductive coupling is produced between the reader communication coil 21 and the data carrier communication coil 18 of the contactless interface 23, so that the carrier signal TS is transmitted into the circuit 8. A method of changing the processing mode of the circuit 8 of the data carrier 7 from the energy-saving processing mode to the normal-consumption processing mode can then be carried out by the data carrier 7 or the circuit 8 of the data carrier 7, which method comprises the following method steps, namely receipt of the carrier signal TS via the contactless interface 23 and detection of the receipt of the carrier signal TS via the contactless interface 23 and generation of the first mode change signal MC1 upon detection of the receipt of the carrier signal TS and outputting of the generated first mode change signal MC1 to the circuit part 12. Receipt of the carrier signal TS is detected by the carrier signal frequency detection stage 25, taking into account the signal frequency of the carrier signal TS, and the detected receipt of the carrier signal TS is indicated by the first indicator signal SS1. Furthermore, the interrupt signal that represents the first mode change signal MC1 is generated by the first interrupt signal generation stage 26 upon receipt of the first indicator signal SS1 and output to the interrupt signal processing stage 13. The clock signal for the microcontroller, that is to say for the circuit part 12, is then activated by the interrupt signal processing stage 13. As a result of the available clock signal, in the microcontroller the program which had already been started prior to the microcontroller being switched to the energy-saving processing mode is continued, namely without any new identification of the user being necessary and without the operating system having to be restarted. Under the control of the program, the second data signals DS2, which represent both the inquiry command and the response to the inquiry command and further information, are exchanged between the reader station 20 and the data carrier 7, as a result of which transport credits stored in the memory stage 14 are changed in the course of this communication. During communication via the contactless interface 23, the coprocessor stage 15 is used to encrypt and decrypt the information exchanged by means of the second data signals DS2.

As soon as the user leaves the control gate, according to the method a receive status change from receiving the carrier signal TS to not receiving the carrier signal TS is detected and the second mode change signal MC2 is output to the interrupt signal processing stage 13 of the circuit part 12, that is to say of the microcontroller, namely as soon as the receive status change has been detected. In the circuit part 12, the clock signal for the microcontroller is then suppressed by the interrupt signal processing stage 13 and the microcontroller is accordingly switched from the normal-consumption processing mode to the energy-saving processing mode. The outputting of the second mode change signal MC2 following detection of the receive status change in this case takes place in a manner delayed by a waiting time, during which waiting time no new receipt of the carrier signal TS is detected following detection of the receive status change.

As a result, it is reliably ensured that the circuit part 12 can be switched, without any intentional or active interaction by a user by means of the mobile telephone 1, solely by detecting receipt of the carrier signal TS, from the energy-saving processing mode to the normal-consumption processing mode, in which normal-consumption processing mode a contactless communication with the reader station 20 that cannot be influenced by the user can be immediately carried out. Furthermore, it is reliably achieved that, again without any action by a user, once a departure has been made from the existence range of the carrier signal TS, the normal-consumption processing mode is left and a switch is made to the energy-saving processing mode as soon as the receive status is changed from receiving the carrier signal TS to not receiving the carrier signal TS.

It should be mentioned that the contactless interface 23 may also be designed in accordance with the standard ISO 15693 or ISO 18000 or ECMA340 to communicate the second data signals DS2.

It should furthermore be mentioned that the contactless interface 23 may also be designed to communicate in a capacitive manner.

It should furthermore be mentioned that the energy-saving processing mode may also comprise a number of sub-energy-saving processing modes and that—for example as a function of the signal strength of the carrier signal TS—a step-wise transition from the sub-energy-saving processing modes to the normal-consumption processing mode or a step-wise transition to the sub-energy-saving processing modes from the normal-consumption processing mode may take place. The sub-energy-saving processing modes are in this case defined by varying amounts of energy that are consumed by the circuit 8, said amounts of energy being smaller than the amount of energy consumed in the normal-consumption processing mode. Such sub-energy-saving processing modes are known to the person skilled in the art for example by the terms "power down mode", "idle mode" or "clock stop mode".

It should furthermore be mentioned that the circuit part of the circuit 8 which is affected by the energy-saving processing mode may also contain the first communication means 10 and/or the second communication means 22 or be formed by said means.

It should furthermore be mentioned that the two mode change signals MC1 and MC2 may also be fed to the clock signal generation means independently of the interrupt signal processing stage 13. In this connection, it should moreover be mentioned that the two mode change signals MC1 and MC2 may also be fed directly to the individual circuit parts of the circuit 8.

The invention claimed is:

1. A data carrier for use with a mobile device having an internal power source, the data carrier comprising:
 a contact interface via which the data carrier is supplied with electrical energy from the internal power source;
 processor circuitry that processes data signals in a normal-consumption processing mode and in an energy-saving processing mode in which less energy is required than in the normal-consumption processing mode, the processor circuitry being switched into the energy-saving processing mode while the energy is being supplied via the contact interface and being switched, in response to a first mode change signal, from the energy-saving processing mode into die normal-consumption processing mode;
 a contactless interface via which a carrier signal is received; and
 a mode change signal generation circuit connected to the contactless interface, the mode change signal generation circuit detecting receipt of the carrier signal via the contactless interface and generating the first mode change signal in response to detecting the carrier signal.

2. A data carrier as claimed in claim 1, wherein the mode change signal generation circuit includes a carrier signal frequency detection stage that detects receipt of the carrier signal and that generates and output an indicator signal which indicates that the carrier signal has been detected.

3. A data carrier as claimed in claim 1, wherein the mode change signal generation circuit includes an interrupt signal generation stage that, as a result of the carrier signal being detected, generates an interrupt signal that represents the first mode change signal.

4. A data carrier as claimed in claim 1, wherein the data carrier, in response to a second mode change signal, is designed to change in a switchable manner from the normal-consumption processing mode to the energy-saving processing mode, and wherein the mode change signal generation circuit detects a receive status change from receiving the carrier signal to not receiving the carrier signal and, upon detection of this receive status change, generates and outputs the second mode change signal.

5. A data carrier as claimed in claim 4, wherein the mode change signal generation circuit outputs the second mode change signal in a manner delayed by a waiting time if, following detection of the receive status change, no new receipt of the carrier signal is detected during the waiting time.

6. A data carrier as claimed in claim 1, wherein the mobile device is a mobile phone.

7. A method of changing a processing mode of a data carrier, the data carrier for use with a mobile device having an internal power source, and the data carrier including a contact interface via which the data carrier is supplied with electrical energy from the internal power source; a contactless interface; and processor circuitry that processes data signals in a normal-consumption processing mode and in an energy-saving processing mode in which less energy is required than in the normal-consumption processing mode, the processor circuitry being switched into the energy-saving processing mode while the energy is being supplied via the contact interface and being switched, in response to a first mode change signal, from the energy-saving processing mode into the normal-consumption processing mode, the method comprising:
 receiving a carrier signal via the contactless interface;
 detecting the receipt of the eater signal;
 generating the first mode change signal in response to detecting the receipt of the carrier signal; and
 outputting the first mode change signal to the processor circuitry.

8. A method as claimed in claim 7, wherein the receipt of the carrier signal is detected taking into account the signal frequency of the carrier signal and the detection of the receipt of the carrier signal is indicated by means of an indicator signal.

9. A method as claimed in claim 7, wherein upon detection of the receipt of the carrier signal an interrupt signal that represents the first mode change signal is generated.

10. A method as claimed in claim 7, wherein a receive status change from receiving the carder signal to not receiving the carrier signal is detected, and wherein upon detection of this receive status change a second mode change signal is generated and outputted to the processor circuitry and wherein the processor circuitry upon receiving the second mode change signal is switched from the normal-consumption processing mode to the energy-saving processing mode.

11. A method as claimed in claim 10, wherein the second mode change signal is output in a manner delayed by a waiting time if, following detection of the receive status change, no new receipt of the carrier signal is detected during the waiting time.

* * * * *